United States Patent [19]

Dixon et al.

[11] Patent Number: 4,889,878

[45] Date of Patent: Dec. 26, 1989

[54] FLOWABLE JOINT SEALANT FOR CONCRETE HIGHWAY

[75] Inventors: Peggy L. Dixon; Christine M. Schmidt, both of Midland, Mich.

[73] Assignee: Dow Corning Corporation, Midland, Mich.

[21] Appl. No.: 181,792

[22] Filed: Apr. 15, 1988

[51] Int. Cl.[4] .......................... C08K 9/04; C08K 5/09; C08K 3/26; C08L 83/08

[52] U.S. Cl. .................................. 523/200; 524/778; 524/788; 524/864

[58] Field of Search ......................... 523/200; 524/864

[56] References Cited

U.S. PATENT DOCUMENTS

| | | | |
|---|---|---|---|
| 3,441,583 | 4/1969 | Murphy | 260/448.2 |
| 3,776,933 | 12/1973 | Toporcer et al. | 260/448.2 |
| 3,817,909 | 6/1974 | Toporcer et al. | 260/37 |
| 3,996,184 | 12/1976 | Klosowski | 260/32.6 |
| 4,323,489 | 4/1982 | Beers | 524/864 |
| 4,447,576 | 5/1984 | Fukayama | 524/864 |
| 4,514,529 | 4/1985 | Beers | 523/200 |
| 4,528,324 | 7/1985 | Chung | 524/864 |

Primary Examiner—C. Warren Ivy
Attorney, Agent, or Firm—Edward C. Elliott

[57] ABSTRACT

A moisture curable composition which is useful for sealing pavement joints consists essentially of 100 parts by weight of a hydroxyl endblocked polydiorganosiloxane, 55 to 120 parts of non-reinforcing, non-acidic filler wherein at least 40 percent by weight of the filler is treated with calcium stearate, 2.5 to 10 parts of diacetamidosilane, and 1 to 6 parts of aminoxysilicone compound. The composition is self leveling when applied to a horizontal surface and when cured has an elongation of at least 1200 percent, a durometer on the Shore OO scale of from 45 to 75 inclusive, and a modulus at 150 percent elongation of less than 50 pounds per square inch.

9 Claims, No Drawings

FLOWABLE JOINT SEALANT FOR CONCRETE HIGHWAY

BACKGROUND OF THE INVENTION

1. Field of the Invention

This invention concerns a method and material for sealing joints in horizontal surfaces, particularly in concrete pavements.

2. Background Information

U.S. Pat. No. 3,817,909, issued June 18, 1974, teaches a low modulus room temperature vulcanizable silicone elastomer is obtained by mixing a hydroxyl endblocked Polydiorganosiloxane, non-acidic, non-reinforcing filler, acetamido containing chain extender and cross-linker which is an aminoxysilicon compound having 3 to 10 aminoxy groups per molecule The sealant is useful in building construction.

U.S. Pat. No. 3,996,184, issued Dec. 7, 1976, teaches a one package low modulus, room temperature vulcanizable silicone elastomer composition is obtained by mixing 100 parts by weight of a hydroxyl endblocked p-lydimethylsiloxane, 0 to 200 parts by weight of a non-acidic, non-reinforcing filler, 2.5 to 10 parts by weight of methylvinyldi(methyl)acetamidosilane, 1 to 6 parts by weight of an aninoxysilicon compound having 3 to 10 aminoxy groups per molecule. and 1 to 5 part by weight of N,N-dimethylformamide, acetonitrile, or N-n-butylacetamide.

Materials such as discussed above have been used as highway sealants Such materials have served very well, but they are difficult to apply because they must be extruded into the joint and then tooled to obtain a good seal to the concrete sides of the joint since the sealants are not self-leveling.

SUMMARY OF THE INVENTION

A self-leveling silicone composition, useful as a sealant in concrete pavement, cures upon exposure to moisture in the atmosphere. The composition consists essentially of a hydroxyl endblocked polydiorganosiloxane; non-acidic, non-reinforcing filler which is a mixture of treated and untreated filler; diacetamido functional silane as chain extender; and aminoxysilicone compound as crosslinking agent. The cured composition has an elongation of at least 1200 percent, a durometer on the Shore 00 scale of from 45 to 75 inclusive, and a modulus at 150 percent elongation of less than 50 pounds per square inch.

DESCRIPTION OF THE INVENTION

This invention relates to a composition which is stable in the absence of moisture but curable at room temperature upon exposure to moisture to a silicone elastomer and being self leveling when applied to a surface, said composition consisting essentially of a mixture prepared by mixing under anhydrous conditions (A) 100 parts by weight of a hydroxyl endblocked polydiorganosiloxane having a viscosity at 25° C. of from 25 to 100 Pa.s and in which the organic groups are selected from the group consisting of methyl, ethyl, vinyl, phenyl, and 3,3,3-trifluoropropyl radicals, in said Polydiorganosiloxane no more than 50 percent of the organic groups being phenyl or 3,3,3-trifluoropropyl radicals and no more than 10 percent of the organic groups being vinyl radicals, (B) from 55 to 120 parts by weight of non-acidic, non reinforcing filler having an average particle size of greater than 2 micrometers, said filler consisting of from 0 to 60 percent by weight of an untreated filler and from 40 to 100 percent by weight of a calcium stearate treated filler, (C) from 2.5 to 10 parts by weight of a silane of the general formula

in which R' is an organic radical selected from the group consisting of methyl, ethyl, and phenyl, said silane being resent in an amount sufficient to provide at least one silane molecule per hydroxyl of the polydiorganosiloxane, (D) from 1 to 6 parts by weight of an aminoxysilicone compound having from 1 to 100 silicon atoms per molecule and from 3 to 10 aminoxy groups per molecule, said aminoxy group having a general formula —OX in which X is a monovalent amine radical selected from the group consisting of —NR$_2$ and a heterocyclic amine radical, R is a monovalent hydrocarbon radical, the —OX group being bonded to silicon atoms through an SiO bond, the remaining valences of the silicon atoms in the aminoxysilicone compound being satisfied by divalent oxygen atoms which link the silicon atoms of the aminoxysilicone compounds having two or more silicon atoms per molecule through silicon-oxygen-silicon bonds and by monovalent hydrocarbon radicals and halogenated monovalent hydrocarbon radicals bonded to the silicon atoms through silicon-carbon bonds, there being an average of at least one monovalent hydrocarbon radical or halogenated monovalent hydrocarbon radical per silicon atom, said silane (C) and said aminoxysilicone compound (D) being present in amounts sufficient to provide a combined weight of at least 5 parts by weight per 100 parts by weight of (A), and said aminoxysilicone compound (D) being present in an amount which is not greater than the weight of the silane (C), the composition being self leveling when applied to a horizontal surface and curing upon exposure to moisture to give an elastomer having an elongation of at least 1200 percent a durometer on the Shore 00 scale of from 45 to 75 inclusive and a modulus at 150 percent elongation of less than 50 pounds per square inch.

An additional feature of a highway sealant which has been found to be desirable is the ability of the sealant to flow out upon application into the crack or joint. If the sealant has sufficient flow, under the force of gravity, it will form an intimate contact with the sides of the irregular joint walls and form a good bond; without the necessity of tooling the sealant after it is extruded into the joint, in order to mechanically force it into contact with the joint sidewalls. This property will be referred to as self-leveling.

The hydroxyl endblocked polydiorganosiloxanes (A) can have a viscosity at 25° C. of from about 25 to 100 Pa.s, preferably from 45 to 65 Pa.s. These polydiorganosiloxane can be monodispersed, polydispersed, or blends of varying viscosities as long as the average viscosity falls within the limits defined above. The hydroxyl endblocked polydiorganosiloxanes have organic groups selected from methyl, ethyl, vinyl, phenyl and 3,3,3-trifluoropropyl radicals. The organic groups of the polydiorganosiloxane contain no more than 50 percent phenyl or 3,3,3-trifluoropropyl radicals and no more than 10 percent vinyl radicals based upon the total number of radicals in the polydiorganosiloxane. Other monovalent hydrocarbon radicals and halogenated monovalent hydrocarbon radicals in small amounts can be present in the polydiorganosiloxane. The diorganosiloxane units of the hydroxyl endblocked polydiorganosiloxane can be, for example, dimethylsiloxane, diethylsiloxane, ethylmethylsiloxane, diphenylsiloxane, methylphenylsiloxane, methylvinylsiloxane, and 3,3,3-trifluoropropylmethylsiloxane. The term polydiorganosiloxane as used herein does not preclude small amounts of other siloxane units such an monoorganosiloxane units. The hydroxyl endblocked polydiorganosiloxanes are known in the art and can be made by known commercial methods. The preferred hydroxyl endblocked polydiorganosiloxane is hydroxyl endblocked polydimethylsiloxane.

The compositions of this invention contain from 55 to 120 parts by weight of non-acidic, non-reinforcing filler having an average particle size of greater than 2 micrometers per 100 parts by weight of hydroxyl endblocked polydiorganosiloxane. The filler consists of from 0 to 60 percent by weight of an untreated filler and from 40 to 100 percent by weight of a calcium stearate treated filler. The filler preferably has an average particle size of from 2.5 to 15 micrometers. The fillers are nonacidic non-reinforcing filler and include for example, calcium carbonate, ferric oxide, diatomacious earth, alumina, hydrated alumina, titanium dioxide, organic fillers, resins such as silicone resins, crushed quartz, calcium sulfate, and the like.

The treated filler is treated with from 0.5 to 1.5, preferably from 0.8 to 1.1 weight percent of calcium stearate by either coating or reacting the filler with the treating agent. Treated fillers are commercially available, such as treated calcium carbonate that is known as CS-11 from Georgia Marble Company of Tate, Ga. which is a stearate surface modified calcium carbonate filler having a median particle size of about 3.9 microns and a stearate content of about 1 percent by weight, and Kotamite from Cyprus Industrial Minerals Company of Englewood, Colo., which is a stearic acid coated calcium carbonate filler having a mean particle size of about 3 microns and a coating of less than 2 percent stearic acid.

The filler is very important in determining whether the composition is self leveling. Self leveling compositions can be obtained by using only calcium stearate treated filler or by blending calcium stearate treated filler with untreated filler within the ratio of from 40 to 100 percent by weight treated filler and 0 to 60 percent untreated filler. With this blend of filler, it is preferred that the filler average particle size be from about 2.5 to 8 micrometers.

The silane (C) of the general formula

reacts with the hydroxyl endblocked polydiorganosiloxaue to give a longer polymer. The longer polymer gives a lower modulus material that is ideal for this type of application. In the formula R' represents an organic radical of the group methyl, ethyl and phenyl. The silanes include, for example, methylvinyldi.(N-methylacetamido)silane, and methylvinyldi-(N-phenylacetamido)silane. A preferred silane (C) is methylvinyldi-(N-methylacetamido)silane. These amidosilanes can be prepared by reacting a chlorosilane with an alkali metal salt of an appropriate N-organoacetamide. This method is further detailed in U.S. Pat. No. 3,776,933, issued Dec. 4, 1973 by Toporcer and Crossan, and hereby incorporated by reference for the preparation of the amidosilanes.

The amidosilanes can be prepared as by the following illustration: mixing a sodium salt of N-methylacetamide with methylevinyldichlorosilane in an inert organic solvent such as toluene, filtering the by-produced sodium chloride from the toluene-product solution, and thereafter removing the toluene by vacuum distillation to obtain the product, methylvinyldi(N-methylacetamido)silane.

The aminoxysilicone compounds (D) can be silicone compounds having from 1 to 100 silicon atoms per molecule in which there are from 3 to 10 aminoxy groups per molecule. The aminoxysilicone compounds can be prepared by the method shown in U.S. Pat. No. 3,441,583, issued Apr. 29, 1969, which also illustrates many aminoxysilicone compounds and is hereby incorporated by reference to show preparation of aminoxysilicone compounds. The aminoxysilicone compounds include silanes and siloxanes. The aminoxy group which is bonded to the silicon atoms through silicon-oxygen bonds can be represented by the general formula —OX wherein X is a monovalent amine radical of the group -NR$_2$ and heterocyclic amine radical. R represents a monovalent hydrocarbon radical. The NR$_2$ groups can be represented by N,N-diethylamino, N,N-ethylmethylamino, N,N-dimethylamino, N,N-diisopropylamino, N,N'-dibutylamino, N,N'-dipentylamino, N,N'-hexylamino N,N'-dibutylamino, N,N-methylpropylamino, N,N'-diphenylamino, and N,N'-methylphenylamino. The heterocyclic amine radicals can be illustrated by ethyleneimino, pyrrolidino, piperidino. and morpholino. Additional aminoxysilicone compounds can be found in U.S. Pat. No. 3,996,184 issued Dec. 7, 1976, which is hereby incorporated by reference to show aminoxysilicone compounds. A preferred aminoxysilicone compound is a copolymer having per molecule an average of two trimethylsiloxane units, five methyl(N,N-diethylaminoxy)siloxane units and three dimethylsiloxane units.

The amount of amidosilane (C) can be from 2.5 to 10 parts by weight per 100 parts by weight of polydiorganosiloxane polymer. The most preferred compositions have from 4 to 8 parts by weight. When the amount of amidosilane is less than 2.5 parts, the resulting composition cures to a silicone elastomer with sufficiently higher modulus so that it would no longer be classified as a low modulus silicone elastomer. The compositions can be packaged with all the reactive ingredients in one package and stored over extended periods of time under anhydrous condition, such as for three months or more. No advantages are experienced in exceeding 10 parts by weight because slower cures and less desirable physical properties are observed.

The amount of aminoxysilicone compound (D) can be from 1 to 6 parts by weight per 100 parts by weight of hydroxyl endblocked polydiorganosiloxane. The preferred amount of aminoxysilicone compound is dependent to some extent upon the viscosity of the hydroxyl endblocked polydiorganosiloxane. The larger amounts of aminoxysilicone compound are preferably used with the higher viscosity polydiorganosiloxane. If the amount of aminoxysilicone compound exceeds 6 parts, the resulting cured products are high modulus silicone elastomers. The preferred amount of aminoxysilicone compound is from 2 to 4 parts. However, the amount of aminoxysilicone compound regardless of viscosity should not exceed the weight of the amidosilane (C) and the combined weight of amidosilane (C) and aminoxysilicone compound (D) should be greater than 5 parts. Amounts of aminoxysilicone compound exceeding the weight of silane (C) result in cured products having high modulus.

The compositions of this invention may contain from 1 to 8 parts by weight of a polar solvent selected from the group consisting of N,N-dimethylformamide, acetonitrile, and N-n-butylacetamide. The preferred solvent is the N,N-dimethylformamide. The preferred amount is from 1 to 3 parts by weight. It has been found that the adhesion of the sealant to the substrate is improved when these solvents are present in the formulation. They do not interfere with the self leveling property or cure of the compositions.

Other conventional additives can be used so long as they are neutral or basic, including pigments, dyes, antioxidants, heat stability additives, and the like.

The amounts used of the ingredients of the composition of this invention are chosen so that the composition, when cured, as for 14 days at 25° C. exposed to air having 50 percent relative humidity, results in a cured silicone elastomer having an elongation of at least 1200 percent, and a modulus at 150 percent elongation of less than 50 pounds per square inch. If the cured sealant does not meet these requirements it does not function as well as when it does meet these requirements when used as a sealant in concrete pavement.

The compositions are preferably made by mixing the hydroxyl endblocked polydiorganosiloxane and filler to make a homogeneous mixture with the filler well dispersed. A suitable mixture can usually be obtained in one hour using commercial mixers. The resulting mixture is preferably deaired and then a mixture of the amidosilane and aminoxysilicone compound is added and mixed with the polymer and filler mixture. This mixing is done under essentially anhydrous conditions. Then the resulting composition is put into containers for storage under essentially anhydrous conditions. Once one package compositions are made, they are stable, that is they do not cure, if the essentially moisture free conditions are maintained, but will cure to low modulus silicone elastomers when exposed to moisture at room temperature. Although the present compositions are designed as one package compositions, the components could be packaged in two or more packages, if desired.

The composition of this invention provides a sealant material which is self leveling when extruded from the storage container into a horizontal joint; that is, the sealant will flow under the force of gravity sufficiently to provide intimate contact between the sealant and the sides of the joint space. This allows maximum adhesion of the sealant to the joint surface to take place. The self leveling also does away with the necessity of tooling the sealant after it is placed into the joint, such as is required with a sealant which is designed for use in both horizontal and vertical joints. Self leveling is defined as a material which gives a reading of not less than 2.0 in the comparative flow test as described in Example 1 below. The compositions of this invention are self-leveling primarily because of the requirement that at least 40 percent by weight of the filler used be a treated filler. If untreated filler is used, the sealant is not self-leveling.

The compositions of the present invention do not require a catalyst to aid in curing the composition and it is observed that many of the conventional curing catalysts used in room temperature vulcanizable silicone elastomer compositions are detrimental to the curing of the compositions.

The compositions of this invention are particularly suitable for use in pavement joints in which the pavement is concrete. The joint can be sealed by merely extruding the composition into the properly prepared (cleaned) joint space and allowing it to self level. The flow of the composition during self leveling also assures that the composition is tight against the side surfaces of the joint, resulting in maximum adhesion of the composition to the concrete. Good adhesion is needed at the sides of the joint so that the sealant remains lightly adhered during those climactic changes when the concrete contracts and the joint is drawn apart, as during winter in Northern climates. If the seal is not maintained, water will collect in the joint, freeze, and destroy the integrity of the joint and the concrete itself.

The following examples are included for illustrative purposes only and should not be construed as limiting the invention which is properly set forth in the appended claims.

Parts are parts by weight.

EXAMPLE 1

Compositions of sealants intended for use in sealing cracks and joints in concrete highways were prepared and tested for suitability in that use.

After each sealant was prepared it was stored in a sealed caulking tube. After storage for 1 day, each sealant was evaluated for flowability. The flow test was a comparative flow. A horizontal target was prepared by inscribing a series of concentric rings upon a paper sheet as follows:

| Ring No. | Diameter |
| --- | --- |
| 1 | ½ inch |
| 2 | ¾ |
| 3 | 1 |
| 4 | 1¼ |
| 5 | 1½ | translucent Teflon sheet was then placed over the target and one milliliter of sealant was extruded onto the Teflon sheet at the center of the target. After 10 minutes, the diameter of the sealant drop was noted and recorded by noting the diameter of the drop or by noting the number of the ring which corresponded. If the result of this test showed a flow corresponding to a diameter of ¾ inch or a comparative flow of at least a 2, the sealant could be expected to be self leveling; that is, the sealant applied in a joint would flow enough to level the upper surface and form an intimate interface between the sealant and the sides of the joint.

Adhesion of the sealant to concrete was evaluated by constructing tensile/adhesion joints as per ASTM C 719. Two 1×1×3 inch concrete blocks were cleaned with compressed air and wiped with toluene, then placed ½ inch apart with ½ inch spacers at each end of the space and a ½ inch backer rod on the bottom of the space. The sealant was then applied by extruding into the space between the blocks until level with the top. This gave a seal which was 2 inches long with a width and height of ½ inch. The specimens were allowed to cure for 21 days at 25° C. and 50 percent relative humidity and then submerged for 7 days in distilled water at room temperature. Each joint was then evaluated by flexing to 60 degrees and by extending the joint by 50 percent. Those joints passing this test were cyclicly tested by repetitive 50 percent extension and 50 percent compression for 10 cycles at room temperature and an extension and compression rate of ⅛ inch per hour, that is, the extension would take place over a 2 hour period to extend and a 2 hour period to return to neutral, then two hours to compress and two hours to return to neutral. The test result is shown as the number of joints which completed the cyclical test without failure, failure being a loss of adhesion between the concrete and the sealant any time during the test, and the number of joints prepared.

The sealant was extruded from the storage tube and formed into test sheets, 80 mm thick and allowed to cure at 25° C. and 50 percent relative humidity for 21 days. Physical properties were run on the samples as shown in Table I. Durometer was determined in accordance with ASTM D 2240, tensile strength, elongation, and modulus in accordance with ASTM D 412.

Sealant 1 was prepared by mixing until uniform 43.2 parts of hydroxyl endblocked polydimethylsiloxane fluid having a viscosity of about 55 Pa.s at 25° C. and a hydroxyl content of about 0.057 weight percent, 20.5 parts of calcium carbonate filler having an average particle size of about 3 micrometers, and 13.7 parts of calcium stearate treated calcium carbonate filler having an average particle size of about 3 micrometers. After mixing and deairing, 2.9 parts of chain extender consisting of about 80 percent by weight of methylvinyldi(N-methylacetamido)silane with the remaining 20 percent being impurities consisting primarily of methyl-Nmethylacatamide, di(methylvinyl-Nacetamido)methylvinylsilane, and xylene and 1.8 parts of an aminoxy-functional crosslinker which was a copolymer having per molecule an average of two trimethylsiloxane units, five methyl(N,N-diethylaminoxy)siloxane units and three dimethylsiloxane units were added in the absence of moisture.

Sealant 2 was prepared in the same manner as sealant 1, except 13.7 parts of the calcium carbonate filler was used and 20.5 parts of the treated calcium carbonate was used. The sealant was evaluated with the results shown in Table I.

Sealant 3 was prepared in the same manner as sealant 2, except untreated calcium carbonate filler having an average particle size of 12.5 micrometers was substituted for the treated filler used in sealant 2.

TABLE I

| Sealant Number | 1 | 2* | 3* |
|---|---|---|---|
| Untreated calcium carbonate, parts | 20.5 | 13.7 | 13.7 + 20.5 |
| Treated calcium carbonate, parts | 13.7 | 20.5 | 0.0 |
| Comparative Flow, inch | 11/16 | 15/16 | 5/16 |
| Adhesion | 0/3 | 1/3 | 3/3 |
| Durometer, Shore A* | 7 | 6 | 8 |
| Tensile strength, psi | 105+ | 95+ | 80 |
| Elongation, percent | 1598+ | 1585+ | 1130 |
| Modulus, psi, at 50% | 29 | 27 | 33 |
| 100% | 32 | 30 | 38 |
| 150% | 35 | 32 | 40 |

*comparative example
Sealant 2 showed some adhesion to concrete and was flowable enough to be self leveling. Sealant 3 showed good adhesion, but was not self leveling.

EXAMPLE 2

A series of compositions were prepared using calcium carbonate fillers having different size particles. Sealant 4 was prepared as for sealant 1. except the filler was 34.2 parts of calcium carbonate having an average particle size of about 5 micrometers. Sealant 5 was made in the same manner, but with a calcium carbonate having an average particle size of about 7 micrometers; sealant 6 was made in the same manner, but with a calcium carbonate having an average particle size of about 12.5 micrometers. Each sealant was tested as in example 1, with the results shown in Table II.

TABLE II

| Sealant Number | 4* | 5* | 6* |
|---|---|---|---|
| Untreated calcium carbonate, parts | 34.2 | 34.2 | 34.2 |
| Treated calcium carbonate, parts | 0.0 | 0.0 | 0.0 |
| Comparative Flow, inch | ⅛ | 5/16 | 5/16 |
| Adhesion | ⅛ | 0/3 | 0/3 |
| Durometer, Shore A | 8 | 6 | 5 |
| Tensile strength, psi | 93 | 66 | 55 |
| Elongation, percent | 1076 | 854 | 667 |
| Modulus, psi, at 50% | 34 | 26 | 25 |
| 100% | 39 | 32 | 29 |
| 150% | 45 | 33 | 32 |

*comparative example
Sealant made with an untreated calcium carbonate filler having a particle size of 5 microns or greater gave compositions which were not self leveling, nor did they give good adhesion to the concrete test blocks.

EXAMPLE 3

A series of sealants were prepared which used a mixture of treated calcium carbonate and untreated calcium carbonate as filler.

Each sealant was prepared and tested as in example 1, with the filler being a mixture of untreated calcium carbonate having an average particle size of about 12.5 micrometers and calcium stearate treated filler having an average particle size of about 3 micrometers. The sealants were prepared and evaluated as in example 1, with the results shown in Table III. These adhesion samples were tested in accordance with ASTM C 719, but without the oven compression cycle and being cyclicly tested for 10 cycles of plus and minus 50 percent elongation and plus 100 minus 50 percent elongation.

TABLE III

| Sealant Number | 7* | 8 | 9 | 10 | 11 | 12 |
|---|---|---|---|---|---|---|
| Untreated calcium carbonate, parts | 34.2 | 27.4 | 20.5 | 17.1 | 13.7 | 6.8 |
| Treated calcium carbonate, parts | 0.0 | 6.8 | 13.7 | 17.1 | 20.5 | 27.8 |
| Comparative Flow, ring number | 1.9 | 2.5 | 3.5 | 3.5 | 3.5 | 3.2 |
| Adhesion | 3/3 | 3/3 | 3/3 | 3/3 | 3/3 | 3/3 |
| Durometer, Shore A | 6 | 5 | 5 | 4 | 5 | 4 |
| Tensile strength, psi | 55 | 57 | 68 | 68 | 77 | 83 |
| Elongation, percent | 788 | 987 | 1231 | 1397 | 1485 | 1567 |
| Modulus, psi, at 150% | 34 | 32 | 35 | 30 | 30 | 29 |

*comparative sample

The results on table III show that the amount of treated filler needs to be above at least 6.8 parts in order to obtain enough flow to be self leveling and in order to have sufficient elongation.

EXAMPLE 4

The polar solvent dimethylformamide [DMF] was added to the sealant formulation of Example 1 to improve adhesion. Sealant base was prepared as in example 1 by mixing the polymer and fillers in a small Hobart mixer for approximately five minutes The base was deaired and Semkit tubes were filled with base. The base was then mixed with a mixture of chain extender, crosslinker, and DMF, the chain extender and crosslinker as in sealant 1 of example 1 and the DMF in the amounts shown in Table IV and mixed in the Semkit mixer for approximately five minutes. The tubes were centrifuged for 30 minutes to remove any air.

Each composition was then extruded from the storage tube and formed into a sheet and cured as above. Testing included DTE, modulus at 50, 100 and 150%, 180 degree peel to concrete skin over time, tack free time and flow. There was no significant difference as to whether the DMF was present or not.

Tensile/adhesion joints (TA joints) were also tested cyclicly and for ultimate elongation both dry and wet. TA joints were prepared using 1×1×3" blocks of 3000 psi concrete which had been scrubbed with a wire brush under running tap water, dried at 70° C. for at least ½ hour and air dried for a minimum of 1 hour. The joints were constructed as previously described in example 1, with closed cell polyethylene backer rod and ½" teflon spacers between the blocks. The final sealant dimensions were ½×½×2". Nine joints were prepared for each formulation——3 each for cyclic testing, percent elongation dry and percent elongation wet.

After 21-day room temperature cure, 3 of the TA joints were placed on the Instron and pulled to destruction (TA percent elongation dry). Mode of failure was adhesive in all cases The remaining 6 joints were submerged in tap water at room temperature for 7 days. At the end of the 7-day water submersion, 3 wet joints were placed on the Instron and pulled to destruction as described above (TA percent elongation wet). Mode of failure was adhesive in all cases. The last 3 joints underwent cyclic movement testing as described in ASTM C719. First, adhesion was evaluated by flexing the joints 60 degrees and then extending them 50%. Those joints passing this test were then cyclicly tested for 10 cycles of +100/−50% extension/compression at room temperature at a rate of ¼" per hour. Excellent adhesion for all formulations was evidenced throughout the cyclic testing. The peel and TA elongation results both showed improved adhesion as the level of DMF increased up to approximately 8 parts DMF. At greater than 8 parts DMF, the curing agents had a tendency to separate from the sealant.

TABLE IV

| DMF, parts | 0.0 | 2.0 | 6.0 | 8.0 |
| --- | --- | --- | --- | --- |
| Tensile Adhesion, dry | | | | |
| Tensile, psi | 25.5 | 21.9 | 21.5 | 22.2 |
| Elongation, % | 697 | 790 | 1112 | 1238 |
| Tensile Adhesion, wet | | | | |
| Tensile, psi | 15.7 | 17.9 | 20.2 | 21.8 |
| Elongation, % | 295 | 548 | 1024 | 1107 |

That which is claimed is:

1. A composition which is stable in the absence of moisture but curable at room temperature upon exposure to moisture to a silicone elastomer and being self leveling when applied to a horizontal surface, said composition consisting essentially of a mixture prepared by mixing under anhydrous conditions
   (A) 100 parts by weight of a hydroxyl endblocked polydiorganosiloxane having a viscosity of 25° C. of from 45 to 65 Pa.s and in which the organic groups are selected from the group consisting of methyl, ethyl, vinyl, phenyl, and 3,3,3-trifluoropropyl radicals, in said polydiorganosiloxane no more than 50 percent of the organic groups being phenyl or 3,3,3-trifluoropropyl radicals and no more than 10 percent of the organic groups being vinyl radicals,
   (B) from 55 to 120 parts by weight of non-acidic, non reinforcing filler having an average particle size of from 2 to 15 micrometers, said filler consisting of from 0 to 60 percent by weight of an untreated calcium carbonate filler and from 40 to 100 percent by weight of a calcium stearate treated calcium carbonate filler,
   (C) from 2.5 to 10 parts by weight of a silane of the general formula

in which R' is an organic radical selected from the group consisting of methyl, ethyl, and phenyl, said silane being present in an amount sufficient to provide at least on silane molecule per hydroxyl of the polydiorganosiloxane,
   (D) from 1 to 6 parts by weight of an aminoxysilicone compound having from 1 to 100 silicon atoms per molecule and from 3 to 10 aminoxy groups per molecule,
   said aminoxy group having a general formula —OX in which X is a monovalent amine radical selected from the group consisting of —NR$_2$ and a heterocyclic amine, R is a monovalent hydrocarbon radical, the —OX group being bonded to silicon atoms through an SiO bond, the remaining valences of the silicon atoms in the aminoxysilicone compound being satisfied by divalent oxygen atoms which link the silicon atoms of the aminoxysilicone compounds having two or more silicon atoms per molecule through silicon-oxygen-silicon bonds and by monovalent hydrocarbon radicals and halogenated monovalent hydrocarbon radicals bonded to the silicon atoms through silicon-carbon bonds, there being an average of at least one monovalent hydrocarbon radical or halogenated monovalent hydrocarbon radical per silicon atom,
   said silane (C) and said aminoxysilicone compound (D) being present in amount sufficient to provide a combined weight of at least 5 parts by weight per 100 parts by weight of (A), and said aminoxysilicone compound (D) being present in an amount which is not greater than the weight of the silane (C),
   the composition being self leveling when applied to a horizontal surface and curing upon exposure to moisture to give an elastomer having an elongation of at least 1200 percent, a durometer on the Shore 00 scale of from 45 to 75 inclusive and a modulus at 150 percent elongation of less than 50 pounds per square inch.

2. The composition of claim 1 in which the fillers have an average particle size of from 2.5 to 8 micrometers.

3. The composition of claim 1 in which the treated filler contains from 0.5 to 1.5 weight percent calcium stearate.

4. The composition of claim 1 in which the silane (C) is methylvinyldi-(N-methylacetamido)silane.

5. The composition of claim 4 in which the aminoxysilicone compound (D) is a trimethylsilyl endblocked siloxane having about 3 dimethylsiloxy units and about 5 N,N-diethylaminoxy(methyl)siloxane groups.

6. The composition of claim 4 in which N,N-dimethylformamide is present in an amount of from 1 to 8 parts by weight.

7. The composition of claim 4 in which the N,N-dimethyformamide is present in an amount of from 1 to 3 parts by weight.

8. A composition which is stable in the absence of moisture but curable at room temperature upon exposure to moisture to a silicone elastomer and being self leveling when applied to a horizontal surface, said composition consisting essentially of a mixture prepared by mixing under anhydrous conditions (A) 100 parts by weight of a hydroxyl endblocked polydimethysiloxane having a viscosity at 25° C. of from 25 to 100 Pa.s, (B) from 55 to 120 parts by weight of non-acidic, non reinforcing filler having an average particle size of from 2 to 15 micrometers, said filler consisting of from 0 to 60 percent by weight of an untreated calcium carbonate filler and from 40 to 100 percent by weight of a calcium stearate treated calcium carbonate filler, (C) from 2.5 to 10 parts by weight of methylvinyldi-(N-methylacetamido)silane, (D) from 1 to 6 parts by weight of an aminoxysilicone compound which is a copolymer having per molecule an average of two trimethylsiloxane units, five methyl(N,N-diethylaminoxy)siloxane units and three dimethylsiloxane units, said silane (C) and said aminoxysilicone compound (D) being present in amounts sufficient to provide a combined weight of at least 5 parts by weight per 100 parts by weight of (A), and said aminoxysilicone compound (D) being present in an amount which is not greater than the weight of the silane (C), the composition being self leveling when applied to a horizontal surface and curing upon exposure to moisture to give an elastomer having an elongation of at least 1200 percent, a durometer on the Shore 00 scale of from 45 to 75 inclusive and a modulus at 150 percent elongation of less than 50 pounds per square inch.

9. The composition of claim 8 in which the treated calcium carbonate filler contains from 0.5 to 1.5 weight percent calcium stearate.

* * * * *